United States Patent [19]
Wei et al.

[11] Patent Number: 5,795,837
[45] Date of Patent: Aug. 18, 1998

[54] PROCESS FOR PREPARING MOLYBDENUM, MOLYBDENUM SILICIDES OR CARBIDES/CERAMIC ADMIXTURES AND SINTERED COMPOSITES

[75] Inventors: Wen-Cheng J. Wei, Taipei; Ming-Hung Lo, Taoyuan Hsien; Feng-Huei Cheng, Taipei, all of Taiwan

[73] Assignee: National Science Council, Taipei, Taiwan

[21] Appl. No.: 697,697

[22] Filed: Aug. 28, 1996

[30] Foreign Application Priority Data

Jul. 5, 1996 [TW] Taiwan ................................. 85108125

[51] Int. Cl.⁶ .................................................. C04B 35/58
[52] U.S. Cl. ............................. 501/87; 501/91; 501/92; 501/96.3; 501/103; 501/127; 501/128; 423/53
[58] Field of Search ................... 501/87, 91, 92, 501/96.3, 103, 127, 128; 423/53

[56] References Cited

U.S. PATENT DOCUMENTS 3,393,971   7/1968   Vanderpool et al. ................. 23/22
5,149,677   9/1992   Merzhanov et al. ............... 501/96.3

*Primary Examiner*—Karl Group
*Attorney, Agent, or Firm*—Townsend and Townsend and Crew LLP

[57] ABSTRACT

The present invention provides a process for preparing a molybdenum, molybdenum silicide or molybdenum carbide/ceramic admixture, comprising dissolving molybdenum trioxide powder with an alkaline solvent to obtain an aqueous solution of molybdate; incorporating ceramic powder with or without silicon and/or carbon powder into the aqueous solution of molybdate to obtain a slurry; and subjecting the slurry to spray drying and reduction to obtain the admixture. The obtained admixture can be formed and sintered into a nanometer-sized and uniformly dispersed molybdenum, molybdenum silicide or molybdenum carbide/ceramic sintered composites.

35 Claims, 1 Drawing Sheet

1

PROCESS FOR PREPARING MOLYBDENUM, MOLYBDENUM SILICIDES OR CARBIDES/CERAMIC ADMIXTURES AND SINTERED COMPOSITES

BACKGROUND OF THE INVENTION

1. Field of the Invention

The present invention relates to a process for preparing molybdenum, molybdenum suicides or carbides/ceramic admixtures and sintered composites, more particularly to a process for preparing the above-mentioned admixtures and sintered composites by the first step of dissolving molybdenum trioxide powder with an alkaline solvent.

2. Description of the Prior Art

In general, ceramic materials have the inherent disadvantages of low fracture toughness, low strength, poor reliability, and particularly, unacceptable low fracture toughness at high temperatures, thus limiting their application.

Many attempts have been made to improve these mechanical properties by incorporating a second phase such as whiskers (Sacks, M. D. et al., *J. Am. Ceram. Soc.*, 71(5)370-70(1988)), fibers (Simpson, L. A. et al., *J. Am. Ceram. Soc.*, 54(1) (1971)56–57), or particulates (Messing, G. L. et al., *J. Am. Ceram. Soc.*, 72(1)40–44(1989)).

In 1986, Niihara and his colleagues first provided the ceramic nanocomposites. They observed significant improvements of mechanical properties even at high temperatures by uniformly dispersing the submicrometer or nano-sized particulate second phase within the matrix grains and at the grain boundaries. Later in 1991, Niihara et al., reviewed the fabrication processes, structure and properties of oxide and nonoxide nanocomposites, and the roles of nano-sized particulate dispersion (Niihara, K., *J. Ceram. Soc. Jpn.*, 99(10) (1991)945–52).

Literature reveals that by incorporating particulate or submicron molybdenum metal or molybdenum-containing compound into the ceramic, the mechanical properties of the ceramic such as strength, fracture toughness and reliability can be effectively improved (McHugh, C. O. et al., *J. Am. Ceram. Soc.*, 49(9) 486–91 (1966), Rankin, D. T. et al., *J. Am. Ceram. Soc.*, 54(6) 277–81 (1971), Nawa, M. et al., *J. Mat. Sci.* 29(1994) 3185–92).

SUMMARY OF THE INVENTION

An object of the present invention is to provide a novel process for preparing molybdenum, molybdenum suicides or carbides/ceramic admixtures. The admixtures can be formed and sintered for fabrication into sintered composites. In the admixtures or sintered composites of the present invention, either of Mo metal, Mo silicide or Mo carbide has an extremely fine particle size (nanometer-sized) and is uniformly dispersed, therefore, the admixtures or sintered composites display relatively good mechanical properties both at room temperature and high temperatures and good stability at high temperatures.

To achieve the above object, the process for preparing the molybdenum (Mo)/ceramic admixture of the present invention, comprising the following steps of:

(a) dissolving molybdenum trioxide powder with an alkaline solvent to obtain an aqueous solution of molybdate;

(b) incorporating ceramic powder into the aqueous solution of molybdate to obtain a molybdate/ceramic slurry;

(c) subjecting the molybdate/ceramic slurry to spray drying to obtain a molybdate/ceramic admixture; and (d) subjecting the molybdate/ceramic admixture to reduction in the presence of a reducing atmosphere at 600°–1000° C. to obtain a Mo/ceramic admixture.

The process for preparing the Mo/ceramic sintered composite of the present invention, comprising further forming and sintering the Mo/ceramic admixture prepared from the above process.

The process for preparing the molybdenum silicide or carbide/ceramic admixture of the present invention, comprising the following steps of:

(a) dissolving molybdenum trioxide powder with an alkaline solvent to obtain an aqueous solution of molybdate;

(b) incorporating ceramic powder and silicon (Si) and/or carbon (C) powder into the aqueous solution of molybdate to obtain a molybdate/Si and/or C/ceramic slurry;

(c) subjecting the molybdate/Si and/or C/ceramic slurry to spray drying to obtain a molybdate/Si and/or C/ceramic admixture;

(d) subjecting the molybdate/Si and/or C/ceramic admixture to reduction in the presence of a reducing atmosphere at 600°1000° C. to obtain a Mo/Si and/or C/ceramic admixture; and (e) heat treating the Mo/Si and/or C/ceramic admixture at 900°–1400° C., whereby Si and/or C reacts with Mo to form a molybdenum silicide or molybdenum carbide, to obtain a molybdenum silicide or molybdenum carbide/ceramic admixture.

The process for preparing the molybdenum silicide or carbide/ceramic sintered composite of the present invention, comprising further forming and sintering the molybdenum silicide or carbide/ceramic admixture prepared from the above process.

According to one aspect of the present invention, the present invention utilizes an alkaline solvent to dissolve molybdenum trioxide powder. Molybdenum trioxide can be decomposed to molecular-scale molybdate, therefore, the molybdenum, molybdenum silicide or molybdenum carbide/ceramic admixtures and sintered composites obtained from the present invention have the molecular-scale molybdenum, molybdenum silicide or molybdenum carbide respectively, which is uniformly dispersed in the ceramic powder matrix.

DETAILED DESCRIPTION OF THE INVENTION

Figure 1:
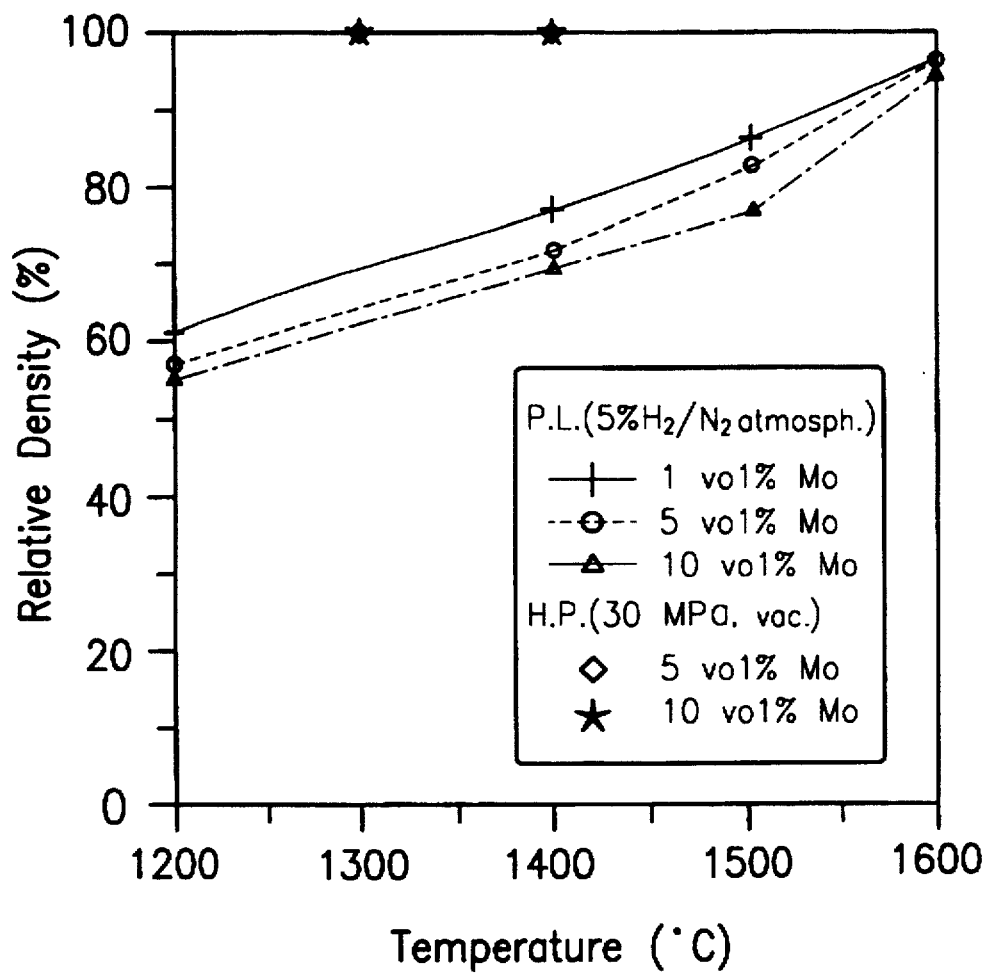
FIG. 1 shows the diagram of the relative density of the Mo/alumina composite sintered by pressureless sintering (P.L.) or by hot-pressed sintering (H.P) versus the sintering temperature.

According to the present invention, molybdenum trioxide ($MoO_3$) is used as the starting material for preparing the molybdenum (Mo), molybdenum silicides or carbides/ceramic admixtures and sintered composites.

Molybdenum trioxide is hardly soluble in water, however, it can be dissolved in an alkaline solvent such as ammonia water and in some acid reagents (Durrant, P. J. and Durrant, B., "Introduction to Advanced Inorganic Chemistry", 2nd ed. (1961)p.1030). And, when molybdenum trioxide is in its dissolved state, it can be in molecular state (nanometer-sized). The present invention utilizes such characteristics of molybdenum trioxide.

First, molybdenum trioxide powder is dissolved with an alkaline solvent to obtain an aqueous solution of molybdate.

The ceramic powder is incorporated into the aqueous solution of molybdate to obtain a molybdate/ceramic slurry. The slurry is then subjected to spray drying and reduction to obtain Mo/ceramic admixture.

When molybdenum trioxide is dissolved with an alkaline solvent, two complex ions, $MoO_4^{2-}$ and $Mo_7O_{24}^{6-}$, are induced (Spanos N. and Lycourghiotis, A., *J. Chem. Soc. Faraday Trans.* 89, 22(1993)4101). The pH value of the solution strongly affects the equilibrium of dissolution. As the pH is larger than 7, the molar fraction of $Mo_7O_{24}^{6-}$ in the solution decreases to zero, while that of $MoO_4^{2-}$ increases to unity. Therefore, according to the present invention, when molybdenum trioxide is dissolved with an alkaline solvent, an aqueous solution of $MoO_4^{2-}$ (molybdate) is formed.

Generally, any alkaline solvent which is capable of decomposing molybdenum trioxide into molybdate is a good candidate for dissolving molybdenum trioxide in the present invention. Examples of such alkaline solvents include ammonia water, lithium hydroxide, sodium hydroxide and potassium hydroxide. When ammonia water is used, the concentration is preferably in the range of 0.1 to 28 percent by weight.

The ceramic powder as a matrix is then incorporated into the aqueous solution of molybdate to obtain a molybdate/ceramic slurry. The ceramic matrix suitable for use in the present invention is the generally used matrix for structural ceramic material, such as alumina, silicon carbide and zirconium oxide. The solid loading of the slurry is preferably in the range of 3.0 to 50 percent by volume.

Since molybdenum trioxide can be dissolved in the alkaline solvent to form molybdate, while ceramic powder can not be dissolved in the alkaline solvent, and the molybdate is in molecular state, and thus smaller than the particle size of ceramic; therefore, after the ceramic powder is incorporated into the aqueous solution of molybdate, the molybdate is uniformly dispersed in the ceramic matrix.

The particle size of the commercially available Mo is generally larger than 1 μm. That is because when the particle size of Mo is too small, the degree of oxidation is high and, as a result, the purity of Mo is undesirable. Therefore, if molybdenum powder is used as the starting material for preparing Mo/ceramic admixture, the particle size of Mo is not fine enough. That is why the inventors of the present invention choose molybdenum trioxide rather than molybdenum as the starting material.

To obtain Mo/ceramic admixtures, there are two technical problems to be solved:

(1) If the concentration of the molybdate solution is too high, the electric double layers on the surface of the ceramic particles is compressed by the molybdate molecules. The ceramic particles can not readily generate suitable repulsion, and thus, molybdate is not uniformly dispersed in the ceramic matrix. Therefore, it is important to prepare a well-dispersed molybdate/ceramic slurry by controlling the concentration of the molybdate solution.

(2) To convert the well-dispersed molybdate/ceramic slurry into a dried admixture, it is important to choose a suitable quick evaporation process which can force the precipitation of the molybdate and prevent the molybdate from re-coagulating. Such that, after the slurry is dried, the obtained powder still sustains the homogeneously mixing state from its precursory slurry.

According to the present invention, spray drying is chosen for drying the molybdate/ceramic slurry into a molybdate/ceramic admixture. During the spray drying process, the molybdenum hydrate particles are quickly precipitated out and adsorbed onto the ceramic matrix particles, thus, the obtained admixture form still sustains the homogeneously mixing state from its precursory slurry.

The molybdate/ceramic admixture is then subjected to reduction in the presence of a reducing atmosphere at 600°–1000° C. to a obtain a Mo/ceramic admixture. The reducing atmosphere generally contains 5 to 100 percent by volume of hydrogen, for example, 100% by volume of hydrogen or the combination of hydrogen and carbon monooxide. The total reduction time is preferably 0.5–8 hours.

In the obtained Mo/ceramic admixture, the Mo content is preferably in an amount of 1–50 percent by volume of the total Mo/ceramic composite powder. The average particle size of Mo is less than 1 μm.

According to the present invention, to obtain a molybdenum silicide or molybdenum carbide/ceramic admixture, when incorporating ceramic powder into the aqueous solution of molybdate as described above for preparing the Mo/ceramic admixture, silicon (Si) and/or carbon (C) powder should further be added to obtain a molybdate/Si and/or C/ceramic slurry.

In the same manners as described above, the molybdate/Si and/or C/ceramic slurry is then subjected to spray drying and reduction to obtain a Mo/Si and/or C/ceramic admixture. Subsequently, the Mo/Si and/or C/ceramic admixture is subjected to heat treatment at 900°–1400° C., such that Si and/or C react(s) with Mo to form a molybdenum silicide or carbide, and the molybdenum silicide or molybdenum carbide/ceramic admixture is obtained.

The above-mentioned heat treatment is conducted in a vacuum, in an inert gas atmosphere, in a reduction gas atmosphere, or a combination atmosphere of an inert gas and a reduction gas.

To obtain a specific molybdenum silicide or carbide/ceramic admixture, the molar ratio of Mo to silicon and/or carbon should be controlled. For example, in order to obtain a molybdenum disilicide ($MoSi_2$)/ceramic admixture, the added amount of molybdenum trioxide powder and silicon powder should be controlled such that the molar ratio of molybdenum trioxide to silicon is 1:2. In order to obtain a pentamolybdenum trisilicide ($Mo_5Si_3$)/ceramic admixture, the added amount should be controlled such that the molar ratio of molybdenum trioxide to silicon is 5:3.

In order to obtain a dimolybdenum carbide ($MO_2C$) /ceramic admixture, the added amount should be controlled such that the molar ratio of carbon to molybdenum trioxide is 1:2. When both silicon and carbon are added into the aqueous solution of molybdate accompanied by ceramic powder, if the addition amount is such that the molar ratio of molybdenum trioxide to silicon to carbon is 5:3:1, then pentamolybdenum trisilicon carbide ($Mo_5Si_3C$)/ceramic admixture is obtained.

The obtained Mo/ceramic admixture, molybdenum silicide or molybdenum carbide/ceramic admixture can be further subjected to forming and sintering to obtain a Mo/ceramic, molybdenum silicide/ceramic or molybdenum carbide/ceramic sintered composite.

The forming can be performed by die pressing, cold isostatic pressing and a combination thereof. The sintering can performed by high temperature reaction sintering, hot-pressed sintering, pressureless sintering, or a combination thereof. The sintering can be conducted in a vacuum, in an inert gas, in a reduction gas atmosphere, or a combination atmosphere of an inert gas and a reduction gas. The high temperature sintering is preferably carried out at above 1100° C. for about 0.5–8 hours. The hot-pressed sintering is preferably carried out at above 1250° C. for about 0.5–8 hours. The pressureless sintering is preferably carried out at above 1250° C. for about 0.5–8hours.

In the Mo, molybdenum silicide or carbide/ceramic sintered composite produced from the novel process of the present invention, Mo, the molybdenum silicide or carbide has very fine (nanometer-sized) particles and is uniformly dispersed. Therefore, the mechanical properties of the ceramic, such as strength, fracture toughness and reliability can be effectively improved.

The following examples are intended to demonstrate this invention more fully without limiting its scope, since numerous modifications and variations will be apparent to those skilled in the art.

Example 1

Molybdenum trioxide ($MoO_3$) powder (Climax Molybdenum Company, U.S.A.) was dissolved in 5 wt % ammonia water ($NH_4OH$) to obtain an aqueous solution of ammonium molybdate. Alumina ($Al_2O_3$) powder (A-16SG, Alcoa Chemical, U.S.A.) was added to an aqueous solution containing a dispersant (such as Darvan C, purchased from R. T. Vanderbilt Co., Conn., U.S.A.) to prepare an alumina dispersion. Then, the alumina dispersion was poured into the aqueous solution of ammonium molybdate and milled for 1 hour to obtain an ammonium molybdate/alumina slurry.

Slurries with different solid loadings and different volume ratios of Mo to alumina were prepared according to the formulations shown in Table 1.

TABLE 1

| solid loading of the slurry | Mo:$Al_2O_3$ (vol) | 5 wt % $NH_4OH$ (ml) | $MoO_3$ (g) | $Al_2O_3$ (g) |
| --- | --- | --- | --- | --- |
| 5 vol % | 1:99 | 475 | 3.878 | 100 |
| | 5:95 | 475 | 20.206 | 100 |
| | 10:90 | 475 | 42.658 | 100 |
| 10 vol % | 1:99 | 450 | 7.756 | 200 |
| | 5:95 | 450 | 40.413 | 200 |
| | 10:90 | 450 | 85.316 | 200 |
| 15 vol % | 1:99 | 425 | 11.634 | 300 |
| | 5:95 | 425 | 60.619 | 300 |
| | 10:90 | 425 | 127.974 | 300 |
| 20 vol % | 1:99 | 400 | 15.512 | 400 |
| | 5:95 | 400 | 80.826 | 400 |
| | 10:90 | 400 | 170.633 | 400 |

Each slurry was then subjected to spray drying to obtain ammonium molybdate/alumina admixture. The conditions for the spray drying is as follows: the flow rate of the feed stock is 400 ml/hr, the flow rate of hot air is 600 Nl/hr, the temperature of the inlet is 175° C., the temperature of the outlet is 95° C. The admixture was subjected to X-ray diffraction analysis (XRD) which determined that after spray drying, ammonium molybdate hydrate was quickly precipitated out, and there is a relative broad diffraction peak near the diffraction angle 10°, indicating that the precipitated ammonium molybdate hydrate is amorphous.

Table 2 shows the agglomerate properties of the spray-dried admixture under different solid loadings of the slurry. The d represents number cumulative particle diameter. For example, $d_{10}=0.5$ μm indicates that the particle size of 10% of the total admixture is less than 0.5 μm. The particle size increases as the solid loading of the slurry increases. On the other hand, the tap density also increases as the solid loading increases, indicating that granular compactability increases due to the broadening of particle size distribution. The repose angle, which is an indication of flowing ability, decreases as the solid loading increases, that is to say, the flowing ability of the admixture has a better flowing ability as the solid loading of the slurry increases. Although all of these characteristics are better for admixtures prepared from higher solid loading, the restriction of solubility of $MoO_3$ in ammonia solution makes it inappropriate to limitlessly increase the solid loading of the slurry.

TABLE 2

| solid loading of the slurry | $d_{10}$ (μm) | $d_{50}$ (μm) | $d_{90}$ (μm) | $\Delta(d_{90}-d_{10})$ (μm) | tap density (g/cm$^3$) | repose angle |
| --- | --- | --- | --- | --- | --- | --- |
| 5 | 0.5 | 1.5 | 4.0 | 3.5 | 1.10 | 57 |
| 10 | 0.8 | 2.2 | 6.0 | 5.2 | 1.14 | 55 |
| 15 | 0.9 | 2.8 | 7.0 | 6.1 | 1.30 | 48 |
| 20 | 1.6 | 4.8 | 16 | 14.4 | 1.45 | 45 |

The spray dried admixture was then subjected to reduction in a reduction furnace under a hydrogen atmosphere with a flow rate of 3 l/min at about 900° C. for about 1 hour. The final product was Mo/alumina admixture.

The homogeneity of the Mo/alumina admixture was evaluated by a statistical method after Hogg (Hogg, R. Am. Ceram. Soc. Bull., 60(2) (1981)p.206–211). Using 25 data of EDS (X-ray energy dispersive spectroscopy) (SW9100, EDAX, U.S.A.) composition analysis on the surface of a die-pressed composite disc as a data base, the observed standard deviation (S), expected (calculated) standard deviation (σ) and the mixing index (M) were computed. The particle size (d) of alumina, volume fraction (p) of the alumina in admixture and the porosity of analyzed body (ε) are 0.4 μm, 0.95 and 48% respectively. If a standard deviation (σ) of 0.5% is tolerated in the measurement, the maximum allowable particle size, $d_{max}$, is calculated to be 0.43 μm which is larger than the size of alumina and represents an appropriate sampling size during the analyzing process.

From 25 measurements of EDS, the expected and observed standard deviation of 5 vol % Mo/$Al_2O_3$ composition were determined to be S=0.0044 and σ=0.0045, respectively. Hence, the mixing index (M) of the spray-dried admixture was 1.007, and a random distribution of alumina in the spray-drying admixture was assured because the mixing index is larger than unity. The homogeneity of the Mo/$Al_2O_3$ by spray-drying and the followed reduction process is evident.

Example 2

The sprayed dried and reduced Mo/alumina admixture was pressed into specimens by die pressing or cold isostatic pressing. In the case of die pressing, 0.5 g of the Mo/alumina admixture was placed in a cylindrical-shaped steel die having a diameter of 10 mm and pressed at a uni-axially pressure of 85 MPa. For cold isostatic pressing, the die-pressed specimen was then subjected to an isostatic pressure of 250 MPa by a cold isostatic pressing machine (KOBEL Co., Japan).

The formed specimens were sintered by either pressureless sintering or hot-pressed sintering. In the case of pressureless sintering, the formed specimen was placed in an alumina crucible and then moved into a tube furnace for sintering. Before the temperature was increased, the furnace was first purged by nitrogen for about 1 hour and then a mixed atmosphere (95% $N_2$-5% $H_2$) was introduced at a flow rate of 500 ml/min. The furnace was then heated to about 1200°–1600° C. at a heating rate of 5° C./min and maintained at the sintering temperature for 1 hour. For hot-pressed sintering, 20 g of the formed specimen was placed in a cylindrical graphite die and then was moved into a furnace for sintering. The sintering conditions were 1200°–1400° C. with an applied pressure of 30 MPa for 1 hour under vacuum of less than $10^{-2}$ torr. FIG. 1 shows the relative density-versus-temperature plot, with different sintering methods and different contents of Mo. After being subjected to pressureless sintering at about 1600° C. or hot pressed sintering at about 1300°, the relative density of the sintered composite exceeded 99.0%.

During the 600°–900° C. of reduction, the growing rate of Mo particles is relatively fast, while the average particle size of alumina is less than 0.5 μm. However, during the high temperature sintering ($\leq 1600°$ C.), the average particle size of Mo is about 0.3 μm, and the growing rate of Mo is slower than that of alumina. That is probably because the particles of Mo second phase are uniformly dispersed in the alumina matrix and are blocked by the alumina matrix, thus preventing the Mo particle from growing. In the sintered Mo/alumina composite, the particle size of Mo is less than 0.4 μm.

Example 3

The procedures as described in Example 1 were employed, except that the alumina powder was replaced by silicon carbide (SiC) powder (grade UF-15, Lonza Co., Germany). Before reduction, ammonium molybdate/SiC admixture was obtained, and after reduction, the Mo/SiC admixture was obtained.

Example 4

The preparation of $MoSi_2$/SiC admixture was described as follows. Molybdenum trioxide powder was dissolved in 5 wt % ammonia water ($NH_4OH$) to obtain an aqueous solution of ammonium molybdate. SiC powder and silicon (grade 4E, KemaNord Company, Sweden) powder were added to the ammonium molybdate solution and milled for 1 hour to obtain an ammonium molybdate/Si/SiC slurry. Silicon is added in a amount of having 2 times the molar number of that of molybdenum trioxide used.

Slurries with different volume ratios of Mo to alumina were prepared according to the formulations shown in Table 3.

TABLE 3

| solid loading of the slurry | $MiSi_2$:SiC (vol) | 5 wt % $NH_4OH$ (ml) | $MoO_3$ (g) | SiC (g) | Si (g) |
| --- | --- | --- | --- | --- | --- |
| 5 vol % | 8:92 | 600 | 14.331 | 88.734 | 5.584 |
|  | 16:84 | 600 | 28.661 | 81.018 | 11.185 |
|  | 25:75 | 600 | 44.783 | 72.338 | 17.476 |
|  | 50:50 | 600 | 90.016 | 48.322 | 35.022 |

Each slurry was then subjected to spray drying to obtain an ammonium molybdate/Si/SiC admixture. The conditions for the spray drying were the same as described in Example 1.

The spray-dried admixture was analyzed by TGA and DTA thermal analyzers (General V4.1C, DuPont 2000, U.S.A.). During the period of being heated from room temperature to about 400° C., ammonium molybdate was gradually decomposed into release ammonia and water vapor, while no distinct decomposition temperature was observed. When the temperature reached about 400° C., the powder stopped losing weight, indicating that ammonium molybdate was completely decomposed to molybdenum trioxide. At that time, the weight loss was measured by TGA to be 12%. Thus, the chemical formula of ammonium molybdate was calculated to be $(NH_4)_2MoO_4 \cdot 0.11H_2O$.

The spray-dried ammonium molybdate/Si/SiC admixture was calcined at about 350° C. for 1 hour to decompose ammonium molybdate and obtain molybdenum trioxide/Si/SiC admixture. The admixture was then placed in a reduction furnace at 900° C. under a hydrogen atmosphere with a flow rate of 3 l/min for 1 hour to completely reduce the molybdenum trioxide into molybdenum metal. The obtained Mo/Si/SiC admixture was then heat treated in a mixed atmosphere of 95% $N_2$–5% $H_2$ at about 1350° C. for about 1 hour to induce the Mo to react with Si and obtain pure $MoSi_2$/SiC admixture.

What is claimed is:

1. A process for preparing a molybdenum (Mo)/ceramic admixture, comprising the following steps of:
   (a) dissolving molybdenum trioxide powder with an alkaline solvent to obtain an aqueous solution of molybdate;
   (b) incorporating ceramic powder into the aqueous solution of molybdate to obtain a molybdate/ceramic slurry;
   (c) subjecting the molybdate/ceramic slurry to spray drying to obtain a molybdate/ceramic admixture; and
   (d) subjecting the molybdate/ceramic admixture to reduction in the presence of a reducing atmosphere at 600°–1000° C. to obtain a Mo/ceramic admixture.

2. The process as claimed in claim 1, wherein the alkaline solvent is selected from the group consisting of ammonia water, lithium hydroxide, sodium hydroxide and potassium hydroxide.

3. The process as claimed in claim 2, wherein the alkaline solvent is ammonia water.

4. The process as claimed in claim 3, wherein the ammonia water has a concentration of 0.1 to 28 percent by weight.

5. The process as claimed in claim 1, wherein the ceramic is selected from the group consisting of alumina, silicon carbide and zirconium oxide.

6. The process as claimed in claim 5, wherein the ceramic is alumina.

7. The process as claimed in claim 5, wherein the ceramic is silicon carbide.

8. The process as claimed in claim 1, wherein the molybdate/ceramic slurry has a solid content of 3.0 to 50 percent by volume.

9. The process as claimed in claim 1, wherein the reducing atmosphere contains 5 to 100 percent by volume of hydrogen.

10. The process as claimed in claim 9, wherein the reducing atmosphere is hydrogen.

11. The process as claimed in claim 9, wherein the reducing atmosphere is a combination of hydrogen and carbon monooxide.

12. The process as claimed in claim 1, wherein the reduction is carried out for about 0.5–8 hours.

13. The process as claimed in claim 1, wherein the Mo content in the obtained Mo/ceramic admixture is in an amount of 1–50 percent by volume of the total Mo/ceramic admixture.

14. The process as claimed in claim 1, wherein the obtained Mo/ceramic admixture contains Mo with a particle size of less than 1 μm.

15. The process for preparing a Mo/ceramic sintered composite, comprising forming and sintering the Mo/ceramic admixture obtained from claim 1.

16. The process as claimed in claim 15, wherein the forming is performed by die pressing, cold isostatic pressing, or a combination thereof.

17. The process as claimed in claim 15, wherein the sintering is performed by high temperature reaction sintering, hot pressed sintering, pressureless sintering, or a combination thereof.

18. The process as claimed in claim 17, wherein the sintering is high temperature reaction sintering at more than 1100° C. for 0.5–8 hours.

19. The process as claimed in claim 17, wherein the sintering is hot pressed sintering at more than 1250° C. for 0.5–8 hours.

20. The process as claimed in claim 17, wherein the sintering is pressureless sintering at more than 1250° C. for 0.5–8 hours.

21. A process for preparing a molybdenum silicide/ceramic admixture, comprising the following steps of:
   (a) dissolving molybdenum trioxide powder with an alkaline solvent to obtain an aqueous solution of molybdate;
   (b) incorporating ceramic powder and silicon (Si) powder into the aqueous solution of molybdate to obtain a molybdate/Si/ceramic slurry;
   (c) subjecting the molybdate/Si/ceramic slurry to spray drying to obtain a molybdate/Si/ceramic admixture;
   (d) subjecting the molybdate/Si/ceramic admixture to reduction in the presence of a reducing atmosphere at 600°–1000° C. to obtain Mo/Si/ceramic admixture; and
   (e) heat treating the Mo/Si/ceramic admixture at 900°–1400° C., whereby Si reacts with Mo to form a molybdenum silicide, to obtain a molybdenum silicide/ceramic admixture.

22. The process as claimed in claim 21, wherein the molybdenum silicide is molybdenum disilicide ($MoSi_2$).

23. The process as claimed in claim 21, wherein the molybdenum silicide is pentamolybdenum trisilicide ($Mo_5Si_3$).

24. The process for preparing a molybdenum silicide/ceramic sintered composite, comprising forming and sintering the molybdenum silicide/ceramic admixture obtained from claim 21.

25. A process for preparing a molybdenum carbide/ceramic admixture, comprising the following steps of:
   (a) dissolving molybdenum trioxide powder with an alkaline solvent to obtain an aqueous solution of molybdate;
   (b) incorporating ceramic powder and carbon (C) powder into the aqueous solution of molybdate to obtain a molybdate/C/ceramic slurry;
   (c) subjecting the molybdate/C/ceramic slurry to spray drying to obtain a molybdate/C/ceramic admixture;
   (d) subjecting the molybdate/C/ceramic admixture to reduction in the presence of a reducing atmosphere at 600°–1000° C. to obtain a Mo/C/ceramic admixture; and
   (e) heat treating the Mo/C/ceramic admixture at 900°–1400° C., whereby C reacts with Mo to form a molybdenum carbide, to obtain a molybdenum carbide/ceramic admixture.

26. The process as claimed in claim 25, wherein the molybdenum carbide is dimolybdenum carbide ($MO_2C$).

27. The process for preparing a molybdenum carbide/ceramic sintered composite, comprising forming and sintering the molybdenum carbide/ceramic admixture obtained from claim 25.

28. A process for preparing a molybdenum silicon carbide/ceramic admixture, comprising the following steps of:
   (a) dissolving molybdenum trioxide powder with an alkaline solvent to obtain an aqueous solution of molybdate;
   (b) incorporating ceramic powder, silicon powder and carbon powder into the aqueous solution of molybdate to obtain a molybdate/Si/C/ceramic slurry;
   (c) subjecting the molybdate/Si/C/ceramic slurry to spray drying to obtain a molybdate/Si/C/ceramic admixture;
   (d) subjecting the molybdate/Si/C/ceramic admixture to reduction in the presence of a reducing atmosphere at 600°–1000° C. to obtain a Mo/Si/C/ceramic admixture; and
   (e) heat treating the Mo/Si/C/ceramic admixture at 900°–1400° C., whereby Si and C react with Mo to form a molybdenum silicon carbide, to obtain a molybdenum silicon carbide/ceramic admixture.

29. The process as claimed in claim 28, wherein the molybdenum silicon carbide is pentamolybdenum trisilicon carbide ($Mo_5Si_3C$).

30. The process for preparing a molybdenum silicon carbide/ceramic sintered composite, comprising forming and sintering the molybdenum silicon carbide/ceramic admixture obtained from claim 28.

31. A process for preparing a ceramic admixture including molybdenum, the method comprising the steps of:
   (a) dissolving molybdenum trioxide powder with an alkaline solvent to obtain an aqueous solution of molybdate;
   (b) incorporating ceramic powder into the aqueous solution of molybdate to obtain a molybdate/ceramic slurry;
   (c) subjecting the molybdate/ceramic slurry to spray drying to obtain a molybdate/ceramic admixture; and
   (d) subjecting the molybdate/ceramic admixture to reduction in the presence of a reducing atmosphere at 600°–1000° C. to obtain the ceramic admixture.

32. A process according to claim 31 wherein the ceramic admixture includes a molybdenum compound selected from the group consisting of a molybdenum silicide, a molybdenum carbide, and a molybdenum silicon carbide.

33. The process as claimed in claim 32, further comprising the steps of:
   incorporating silicon (Si) powder into the aqueous solution of molybdate, which is conducted at the same time as step (b); and
   (e) heat treating the admixture obtained from step (d) at 900°–1400° C., whereby Si reacts with Mo to form a molybdenum silicide, to obtain a molybdenum silicide-containing ceramic admixture, and wherein step (e) is conducted after step (d).

34. The process as claimed in claim 32, further comprising the following steps of:

incorporating carbon (C) powder into the aqueous solution of molybdate, which is conducted at the same time as step (b); and (e) heat treating the admixture obtained from step (d) at 900°–1400° C., whereby C reacts with Mo to form a molybdenum carbide, to obtain a molybdenum carbide-containing ceramic admixture, and wherein step (e) is conducted after step (d).

35. The process as claimed in claim 32, further comprising the steps of:

incorporating silicon powder and carbon powder into the aqueous solution of molybdate, which is conducted at the same time as step (b); and (e) heat treating the admixture obtained from step (d) at 900°–1400° C., whereby Si and C react with Mo to form a molybdenum silicon carbide, to obtain a molybdenum silicon carbide-containing ceramic admixture, and wherein step (e) is conducted after step (d).

* * * * *